Feb. 5, 1952     C. R. PERRY     2,584,366
COMBINED VEHICLE BUMPER AND TRAILER HITCH
Filed Sept. 17, 1947     2 SHEETS—SHEET 1
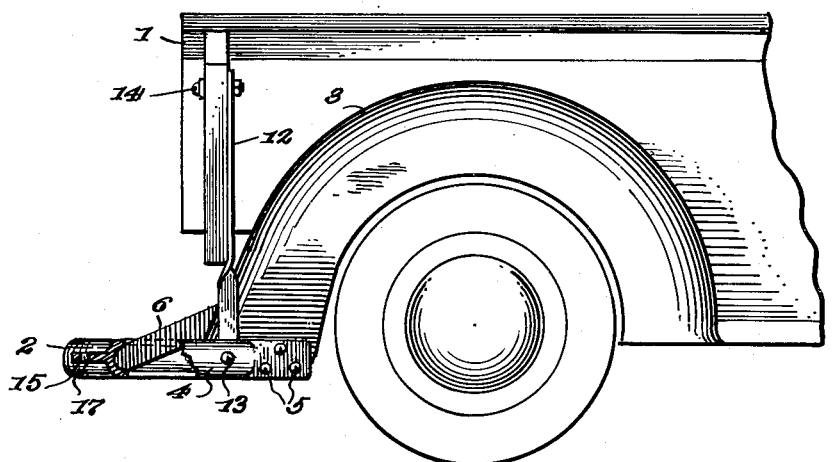
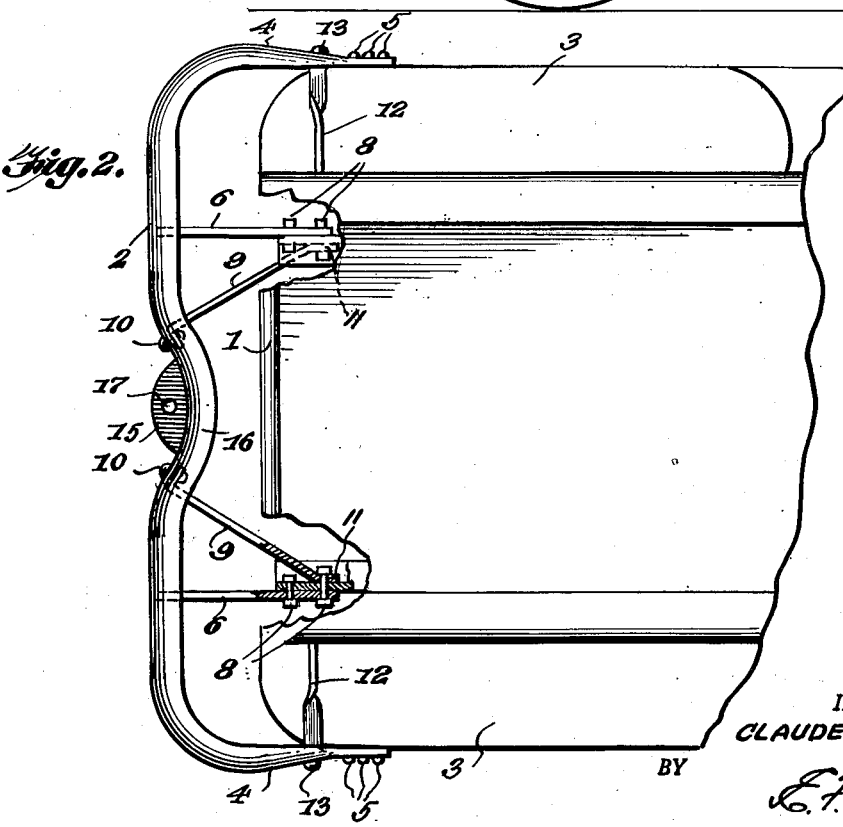
INVENTOR.
CLAUDE R. PERRY
BY
ATTORNEY Feb. 5, 1952          C. R. PERRY          2,584,366
COMBINED VEHICLE BUMPER AND TRAILER HITCH
Filed Sept. 17, 1947          2 SHEETS—SHEET 2
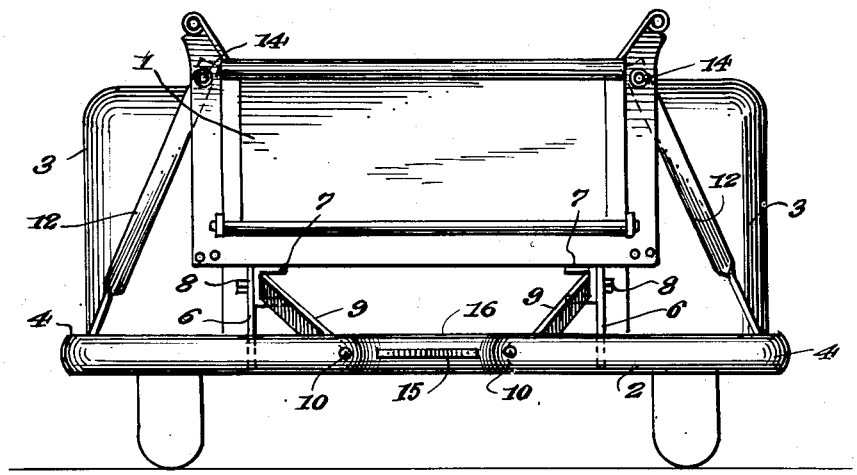
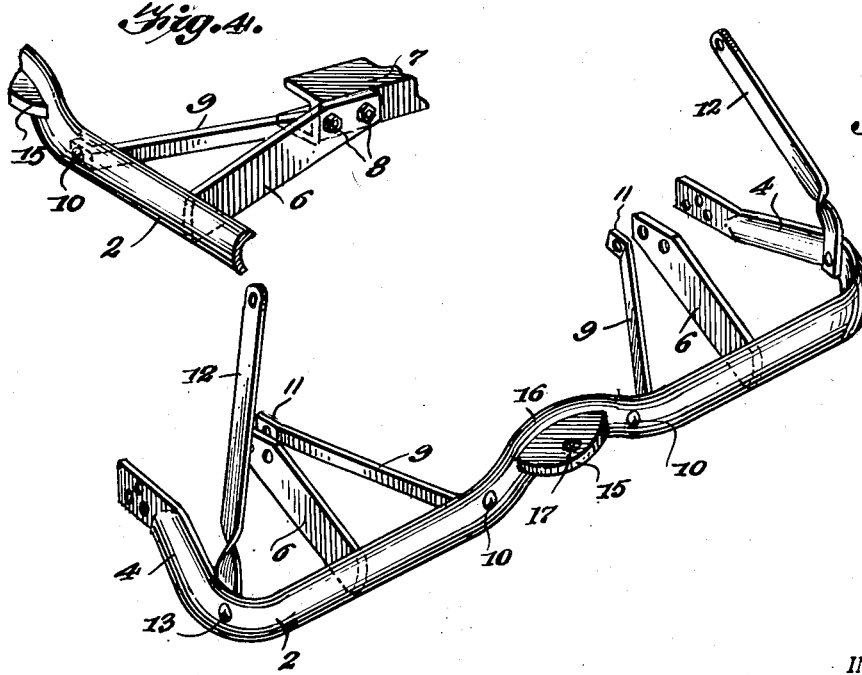
INVENTOR.
CLAUDE R. PERRY
BY
*E. F. Salter*
ATTORNEY Patented Feb. 5, 1952

2,584,366

UNITED STATES PATENT OFFICE 2,584,366

COMBINED VEHICLE BUMPER AND TRAILER HITCH

Claude R. Perry, Waco, Tex.

Application September 17, 1947, Serial No. 774,591

3 Claims. (Cl. 280—33.44)

This invention relates to a combined bumper and trailer hitch for towing vehicles.

An important object of the invention is to provide a combined bumper and trailer hitch which is sturdily constructed and adapted to be rigidly mounted at the rear of a truck, or other towing vehicle, to serve very effectively as a rear bumper therefor and also as a hitch to which a trailer may be readily connected.

Another object is to provide a device of the character indicated which is of such construction that it will protect the rear end and the rear fenders of the towing vehicle from damage in case of a collision with another vehicle or in the event the towing vehicle strikes obstructions in the path of movement thereof, and will also reinforce the rear fenders against vibration and loosening.

A further object of the invention resides in the provision of a combined bumper and trailer hitch wherein a portion of the bumper intermediate its length is formed with a recess or seat in which the trailer hitch is mounted so that it does not project beyond the rear surface of the bumper.

A still further object is to provide a device of the character specified embodying a trailer hitch which is so formed and mounted that it offers no interference to the required swinging of the trailer relative to the towing vehicle.

Other objects and advantages will be apparent from the following description when considered in connection with the accompanying drawings, wherein:

Figure 1 is a side elevation showing the improved bumper and hitch mounted at the back of a motor truck.

Figure 2 is a top plan view of the truck and combined bumper and hitch.

Figure 3 is a view looking at the rear of the truck and combined bumper and hitch.

Figure 4 is a perspective view of a portion of the bumper and hitch and its connection with the chassis bars of the truck.

Figure 5 is a perspective view of the combined bumper and hitch.

The towing vehicle 1, to which the improved bumper and trailer hitch 2 is shown applied, is a truck of conventional construction but it will be understood that this vehicle may be a motor vehicle of any type. The vehicle 1 is of course provided with the usual front and rear fenders, the rear fenders being indicated by the numeral 3.

The bumper 2 is formed of strong metal, such as steel, and is of such length that it will extend across the rear end of the vehicle with its forwardly projecting arms 4 disposed at opposite sides of the vehicle. The arms 4 are fixedly secured to the skirt portions of the rear fenders by rivets 5 and serve to brace or reinforce the fenders and also to protect the rear fenders from damage in the event of a collision with another vehicle or striking obstructions in the path of movement of the towing vehicle. For the major portion of its length, the bumper bar is of concavo-convex formation with its concave face presented inwardly but the front end portions of the arms 4 are flattened so that they have full face-to-face engagement with the outer sides of the rear fenders. The concavo-convex formation in combination with the flattened end portions of the arms 4 provides an exceedingly strong and rigid construction.

The primary mounting for the bumper 2 comprises relatively heavy bracket bars 6 which are welded or otherwise rigidly anchored to the bumper and extend forwardly therefrom and have their front ends secured to the chassis bars 7 by bolts 8. To provide additional support for the bumper and brace the same against movement transversely of the towing vehicle, braces 9 are employed. These braces are located between the brackets 6 and have their rear ends firmly secured to the bumper, as shown at 10. The braces 9 extend forwardly from the bumper in diverging relation to each other with their front ends 11 secured to the chassis bars 7 by forward ones of the bolts 8.

For the purpose of bracing or reinforcing the arms 4 of the bumper against downward bending as well as preventing the arms 4 from being bent inwardly, there is provided the braces 12 which have their lower ends secured to the arms 4 by bolts or rivets 13. The braces 12 extend upwardly from the bumper at an inward incline and have their upper ends secured to opposite side portions of the vehicle body by bolts or the like 14. The braces 12 serve also to reinforce and strengthen the sides of the vehicle body.

In addition to serving as a rear bumper for a vehicle, the improved device also serves as a hitch for a trailer which is to be towed by the vehicle. The hitch is carried by the bumper midway the length thereof and consists of a metal plate 15 which is welded to the bumper and occupies a recess or seat formed by the forwardly bowed portion 16 of the bumper. This forwardly bowed portion is arcuate longitudinally of the bumper or in a direction transversely of the vehicle. The inner or forward edge of the plate 15 which is welded throughout its extent to the wall of the recess is correspondingly shaped. The outer or rear edge of the plate 15 is also arcuate, the length of the plate and the curvature of its rear edge being such that when a shackle is pivotally connected to the plate by a pin passing through the opening 17 formed through the plate, the shackle may have swinging movement from a position longitudinally of the towing vehicle to a position at substantially right angles thereto. This allows the towing vehicle to make a sharp turn to the right or left and the trailer then follows the towing vehicle. It should also be noted that the curvature of the bowed portion 16 and the dimensions of the plate 15 are such that the plate does not project rearwardly beyond the bumper. Therefore, the plate cannot cause damage to the radiator of the vehicle in case the towing vehicle should back into the same, or be struck by a vehicle failing to stop soon enough when approaching the towing vehicle from the rear. In addition, a person walking between the towing vehicle and a vehicle located adjacent and behind the towing vehicle cannot be injured by the hitch plate.

Having thus described the invention, what is claimed is:

1. A combined vehicle bumper and trailer hitch comprising a bumper bar that is much wider than it is thick and that is designed to be mounted across the rear end of the vehicle with its width generally vertically disposed, said bar having a fully integral intermediate portion that is bowed forwardly to form a recess that is open vertically and rearwardly, and a horizontal plate welded to said intermediate portion to strengthen it and for hitching purposes, said plate being so disposed as to bridge the recess and so dimensioned that its back edge is substantially within the plane of the rear surface of the bumper bar, and means on said plate for hitching a trailer to said bumper bar.

2. In the structure defined in claim 1, said plate being located entirely within said recess.

3. In the structure defined in claim 1, said plate being located entirely within said recess and having an arcuate back edge.

CLAUDE R. PERRY.

REFERENCES CITED

The following references are of record in the file of this patent:

UNITED STATES PATENTS

| Number | Name | Date |
|---|---|---|
| 1,531,568 | Olcott | Mar. 31, 1925 |
| 1,579,621 | Kleven | Apr. 6, 1926 |
| 1,739,456 | Hansen | Dec. 10, 1929 |
| 2,090,857 | White | Aug. 24, 1937 |
| 2,151,920 | Jandus | Mar. 28, 1939 |
| 2,207,895 | Rauen | July 16, 1940 |